(12) United States Patent
Zou

(10) Patent No.: US 10,128,729 B2
(45) Date of Patent: Nov. 13, 2018

(54) INTERMITTENT MOVEMENT TYPE STRONG MAGNETIC MOTOR

(71) Applicant: Jiuda Zou, Guangdong (CN)

(72) Inventor: Jiuda Zou, Guangdong (CN)

( * ) Notice: Subject to any disclaimer, the term of this patent is extended or adjusted under 35 U.S.C. 154(b) by 295 days.

(21) Appl. No.: 15/039,844

(22) PCT Filed: Jan. 13, 2014

(86) PCT No.: PCT/CN2014/000041
§ 371 (c)(1),
(2) Date: May 26, 2016

(87) PCT Pub. No.: WO2015/096178
PCT Pub. Date: Jul. 2, 2015

(65) Prior Publication Data
US 2016/0372996 A1  Dec. 22, 2016

(30) Foreign Application Priority Data

Dec. 24, 2013 (CN) .......................... 2013 1 0724282

(51) Int. Cl.
| | |
|---|---|
| *H02K 1/34* | (2006.01) |
| *H02K 23/36* | (2006.01) |
| *H02K 33/18* | (2006.01) |
| *H02K 1/17* | (2006.01) |
| *H02K 1/26* | (2006.01) |
| *H02K 3/32* | (2006.01) |

(52) U.S. Cl.
CPC ............... *H02K 23/36* (2013.01); *H02K 1/17* (2013.01); *H02K 1/26* (2013.01); *H02K 1/34* (2013.01); *H02K 3/32* (2013.01); *H02K 33/18* (2013.01)

(58) Field of Classification Search
CPC ................................. H02K 1/34; H02K 33/18
See application file for complete search history.

(56) References Cited

U.S. PATENT DOCUMENTS

| | | | | |
|---|---|---|---|---|
| 994,058 | A * | 5/1911 | Coates ................... | H02K 15/12 310/265 |
| 3,859,547 | A * | 1/1975 | Massie .................. | H01F 7/1615 310/14 |
| 6,242,823 | B1* | 6/2001 | Griswold ........... | H02K 41/0356 310/12.12 |
| 7,629,713 | B2* | 12/2009 | Beaulieu ................. | F02B 63/04 123/1 A |

* cited by examiner

*Primary Examiner* — Dang Le

(57) ABSTRACT

An intermittent movement type strong magnetic motor having a control device (PLC) for first controlling an arresting device to lock an electromagnetic coil, then controlling a power supply device to start power supply. After a given length of time of power supply when the current rises to the highest point or rises to a level as required, the arresting device releases the electromagnetic coil quickly to allow the electromagnetic coil to move and operate immediately. The intermittent movement type strong magnetic motor maximally avoids restriction of counter-electromotive force and makes full use of the great action force created between magnetic fields and the electromagnetic coil, thereby ideally converting magnetic forces to mechanical energy and increasing energy efficient ratio of the motor.

3 Claims, 3 Drawing Sheets

INTERMITTENT MOVEMENT TYPE STRONG MAGNETIC MOTOR

BACKGROUND OF THE INVENTION

The present invention relates to an intermittent movement type strong magnetic motor.

A conventional permanent-magnet DC motor makes use of the magnetic field principle of "like poles repelling each other, and opposite poles attracting each other" to render an electromagnetic coil set between two permanent magnets to perform reciprocating movement or rotational movement repeatedly, thereby converting electrical energy into mechanical energy. However, this method of conversion is restricted by counter-electromotive force (i.e. counterforce) in the movement process. Its energy efficiency is relatively low. Facing the world's tight energy supply today, providing an intermittent movement type strong magnetic motor with a higher energy efficient ratio is undoubtedly an issue that needed to be addressed at the moment.

BRIEF SUMMARY OF THE INVENTION

The technical problem to be solved is to overcome the aforesaid disadvantages now present in the prior art. The present invention provides an intermittent movement type strong magnetic motor which can maximally avoid the restriction of counter-electromotive force (i.e. counterforce) and has a higher energy efficient ratio.

According to the intermittent movement type strong magnetic motor provided by the present invention, the invention comprises two permanent magnets, an electromagnetic coil set between the two permanent magnets, a power supply device and a power output device connected with the electromagnetic coil, and an arresting device which can automatically lock/release the electromagnetic coil. The arresting device comprises a locking mechanism and a transmission device that drives the movement of the locking mechanism. A control device which can control power connection/disconnection and reversal of current direction of the power supply device and which can also control the operation of the transmission device is provided. The electromagnetic coil performs intermittent linear reciprocating movement or intermittent rotational movement repeatedly between the two permanent magnets. The arresting device must lock the electromagnetic coil each time when the electromagnetic coil starts a journey of movement. Before each time the electromagnetic coil is being locked, the control device first controls the power supply device to disconnect with power. After the arresting device locks the electromagnetic coil, the control device controls the power supply device to start power supply. After the power supply device has supplied power for a given length of time, the arresting device releases the electromagnetic coil quickly. The electromagnetic coil disengaged from the arresting device starts to move and operate.

The present invention also has the following additional technical features:

The arresting device comprises two arresters. The transmission device comprises two cylinders. Each arrester is mounted on an output shaft of each corresponding cylinder.

The electromagnetic coil has a shape of a cylinder. Opposite ends of the two permanent magnets facing towards each other have the same pole.

Another kind of the electromagnetic coil winds around an iron core to form an overall spherical shape. The iron core comprises a columnar body and large ends at both ends of the columnar body respectively. The large ends form part of the sphere. The coil winds around the columnar body in a shape that forms the remaining part of the sphere. Two opposite ends of the two permanent magnets facing towards each other have opposite poles.

The given length of time of power supply is 0.1 second to 0.2 second (the specific length of time is set as needed).

Compared with the prior arts, the present invention has the following advantages: the inventive concept of the present invention is that the present invention operates differently from the way that a conventional permanent magnet DC motor operates. Through cooperation between the arresting device which automatically locks/releases the electromagnetic coil and the power supply device which automatically reverses current direction and achieves associated connection/disconnection with the power, the strong magnetic motor performs intermittent movement, thereby maximally avoiding the restriction of counter-electromotive force (i.e. counterforce) and making full use of the great action force created between the magnetic fields of the permanent magnets and the electromagnetic coil (because the action force is in proportion to magnetic field strength). The constantly strong permanent magnets are converted into mechanical energy ideally, thus increasing the energy efficient ratio of motor.

DETAILED DESCRIPTION OF THE INVENTION

Figure 1:
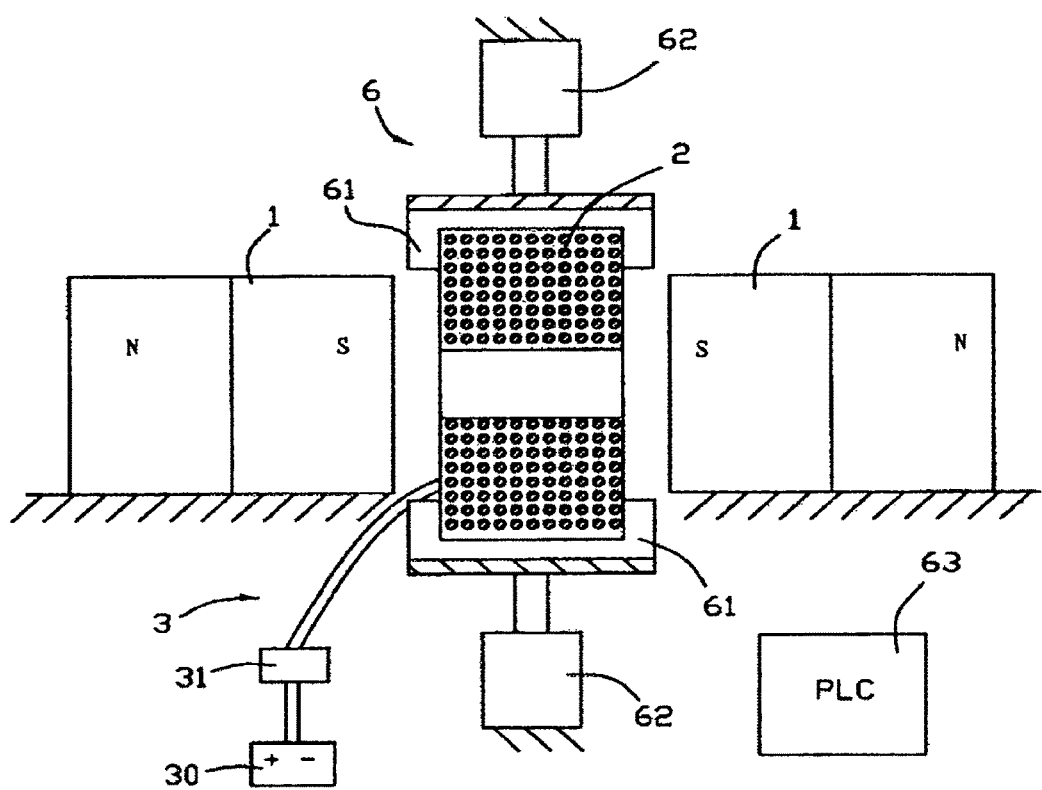
FIG. 1 illustrates the structure of a preferred embodiment of the present invention.
Figure 2:
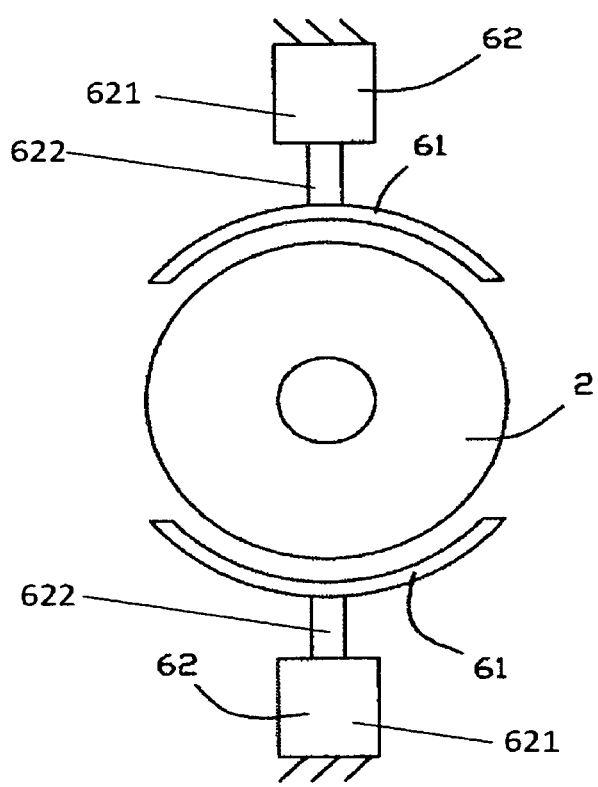
FIG. 2 is a cross sectional view showing a structure of the cylindrical electromagnetic coil and the arresting device shown in FIG. 1.

With reference to FIG. 1 and FIG. 2, a preferred embodiment of the intermittent movement type strong magnetic motor of the present invention is shown, comprising: two permanent magnets 1 and an electromagnetic coil 2 set between the two permanent magnets. A power supply device 3 and a power output device are connected with the electromagnetic coil. The electromagnetic coil is in the shape of a cylinder. Respective opposite ends of the two permanent magnets facing towards each other have the same pole. The electromagnetic coil performs intermittent linear reciprocating movement between the two permanent magnets. In this embodiment, the power supply device is a combination of DC power supply 30 and a commutator 31. An arresting device comprises a locking mechanism 61 and a transmission device 62 that drives the movement of the locking mechanism. A control device 63 which can control power connection/disconnection and reversal of electric current direction of the power supply device 3, and which can control the operation of the transmission device 62, is provided. The electromagnetic coil performs intermittent linear reciprocating movement between the two permanent magnets. The arresting device must lock the electromagnetic coil each time when the electromagnetic coil starts a journey of movement. Before each time the electromagnetic coil is being locked, the control device first controls the power supply device to disconnect with power. After the arresting device locks the electromagnetic coil, the control device controls the power supply device to start power supply. After the power supply device has supplied power for a given length of time, the arresting device releases the electromagnetic coil quickly. The electromagnetic coil disengaged from the arresting device starts to move and operate. The locking mechanism 61 comprises two arresters. The transmission device 62 comprises two cylinders 621. Each arrester is mounted on an output shaft 622 of each corresponding cylinder 621. However, the transmission device can also take other forms, such as a hydraulic cylinder. In this embodiment, cross section of each arrester is in an arc shape.

Wherein, the power output device 5 (not shown in the figures) can take a variety of different forms based on the prior arts. Fixation of the two permanent magnets as well as the connection and fixation between the electromagnetic coil and the power output device are prior arts (for example the structure and form disclosed by Chinese invention patent application number 200910036535.7). Details of which will not be described again herein. The control device can also take various forms according to the prior arts. A main aim of the control device is to control the operation of the transmission device, the power connection/disconnection and the reversal of electric current direction of the power supply device. The present invention adopts PLC controlling.

The given length of time of power supply is specifically set according to differences in factors such as load and input power of the motor during actual use. The given length of time of power supply is set because it takes a given length of time for the flow of current in the electromagnetic coil to climb up to a certain level. As for the present invention, before the movement of electromagnetic coil, the flow of current being input must reach a certain level. The preferred power given length of time of power supply is the time needed for the flow of current to climb up to the highest point, generally 0.1 seconds to 0.2 seconds.

The arresting device must lock the electromagnetic coil each time when the electromagnetic coil starts a journey of movement. A journey of movement herein means a journey of movement before reversal of current direction in the electromagnetic coil. Once reversal of current direction occurs, another journey of movements begins. As the reversal of current direction repeats, the present invention likewise operates repeatedly.

At the beginning of operation, the power supply device is in a power-off state under the control of the control device. After that, the automatic control device 63 drives the transmission device 62 so that the arresters lock the electromagnetic coil. Then, the power supply device is controlled by the control device to supply power. After the power supply device has supplied power for 0.1 second to 0.2 second (the specific length of time is set as needed), the arresting device releases the electromagnetic coil quickly. The electromagnetic coil disengaged from the arresting device immediately starts to move and operate. When a journey of movement of the electromagnetic coil comes to an end (that is, a beginning of another journey of movement), the control device first controls the power supply device to disconnect the power, then the control device 63 drives the transmission device 62 again to make the arresters lock the electromagnetic coil again. After the power supply device has been controlled to reverse the current direction through the commutator and supplied power for 0.1 second to 0.2 second (the specific length of time is set as needed), the arresting device releases the electromagnetic coil quickly. The electromagnetic coil disengaged from the arresting device immediately starts to move and operate.

An important inventive concept of the present invention is that, through cooperation between the arresting device 6 which automatically locks/releases the electromagnetic coil and the power supply device which automatically reverses the current direction and achieves associated connection/disconnection with the power, the strong magnetic motor performs intermittent movement, thereby maximally avoiding the restriction of counter-electromotive force (i.e. counterforce) and making full use of the great action force created between the magnetic fields of the permanent magnets and the electromagnetic coil (because the action force is in proportion to magnetic field strength). The constantly strong permanent magnets are converted into mechanical energy ideally, thus increasing the energy efficient ratio of motor.

Figure 3:
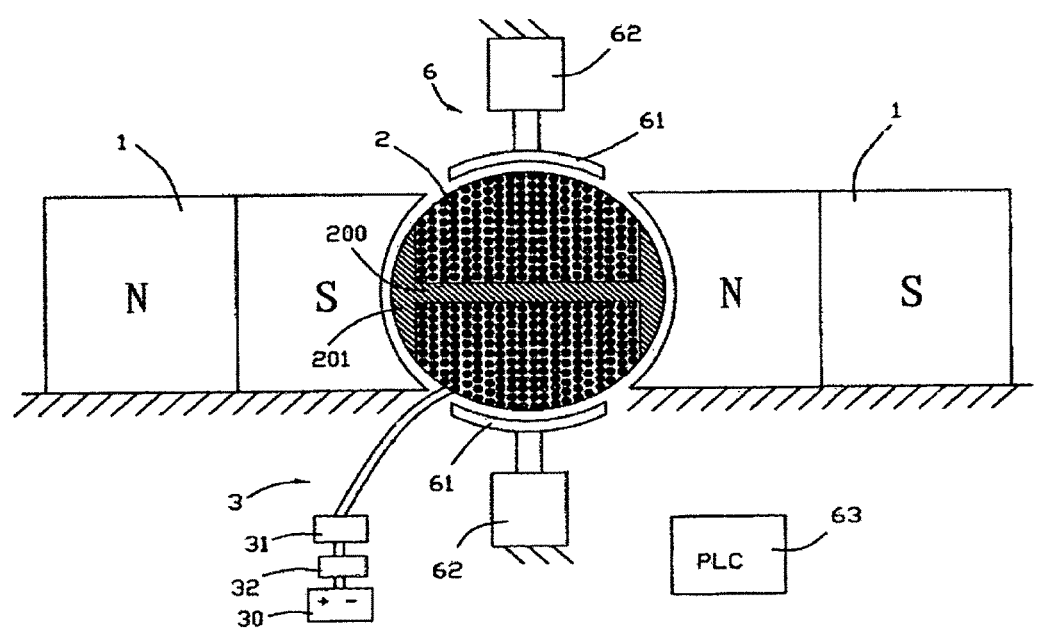
FIG. 3 illustrates the structure of another preferred embodiment of the present invention.

With reference to FIG. 3, another preferred embodiment of the present invention is shown. The difference is that the electromagnetic coil winds around an iron core and is spherical as a whole. The iron core comprises a columnar body 200 and large ends 201 at both ends of the columnar body respectively. The large ends form part of the sphere. The coil winds around the columnar body in a shape that forms the remaining part of the sphere. Two opposite ends of the two permanent magnets facing towards each other have opposite poles. The electromagnetic coil performs intermittent rotational movement. The power output device of this embodiment (not shown in the figures) can take a variety of different forms based on the prior arts, such as adopting the power output device in Chinese invention patent application number 200910038014.1 whose details will not be described again herein.

What is claimed is:

1. An intermittent movement type strong magnetic motor, comprising two permanent magnets (1), an electromagnetic coil (2) set between the two permanent magnets (1), and a power supply device (3) connected with the electromagnetic coil (2), wherein the intermittent movement type strong magnetic motor also comprises an arresting device (6) which is capable of automatically locking/releasing the electromagnetic coil (2); the arresting device (6) comprises a locking mechanism (61) and a transmission device (62) that drives the locking mechanism (61) to move; a control device (63) which controls power connection/disconnection and reversal of current direction of the power supply device (3) and which also controls operation of the transmission device (62), is also provided; the electromagnetic coil performs intermittent linear reciprocating movement or intermittent rotational movement repeatedly between the two permanent magnets (1); the arresting device (6) locks the electromagnetic coil (2) each time when the electromagnetic coil (2) starts a journey of movement; before each time the electromagnetic coil (2) is being locked, the control device (63) first controls the power supply device (3) to disconnect with power; after the arresting device (6) locks the electromagnetic coil (2), the control device (63) controls the power supply device (3) to start power supply; after the power supply device (3) has supplied power for a given length of time, the arresting device (6) releases the electromagnetic coil (2) quickly; the electromagnetic coil (2) disengaged from the arresting device (6) starts to move and operate; the electromagnetic coil winds around an iron core to form an overall shape of a sphere; the iron core comprises a columnar body (200) and large ends (201) at both ends of the columnar body (200) respectively; the large ends (201) form part of the sphere; the electromagnetic coil winds around the columnar body (200) in a shape that forms a remaining part of the sphere; two opposite ends of the two permanent magnets facing towards each other have opposite poles.

2. The intermittent movement type strong magnetic motor as described in claim 1, wherein the arresting device comprises two arresters; the transmission device comprises two cylinders (621); each arrester is mounted on an output shaft (622) of each corresponding cylinder (621).

3. The intermittent movement type strong magnetic motor as described in claim 1, wherein the given length of time of power supply is 0.1 second to 0.2 second.

\* \* \* \* \*